(12) United States Patent
Mizukura et al.

(10) Patent No.: US 8,286,744 B2
(45) Date of Patent: Oct. 16, 2012

(54) FUEL PUMP ATTACHMENT STRUCTURE AND MOTORCYCLE

(75) Inventors: Yuki Mizukura, Wako (JP); Akihito Kobayashi, Wako (JP); Takahiro Matayoshi, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 608 days.

(21) Appl. No.: 12/361,360

(22) Filed: Jan. 28, 2009

(65) Prior Publication Data
US 2009/0242300 A1 Oct. 1, 2009

(30) Foreign Application Priority Data
Mar. 27, 2008 (JP) .................. 2008-083571

(51) Int. Cl.
*B60K 15/03* (2006.01)

(52) U.S. Cl. ...................... 180/69.4; 280/835

(58) Field of Classification Search .................. 180/219, 180/69.4; 280/834, 835; 220/567.2; 224/413
See application file for complete search history.

(56) References Cited

U.S. PATENT DOCUMENTS

| | | | | |
|---|---|---|---|---|
| 3,882,077 A | * | 5/1975 | Takita et al. | 524/496 |
| 5,211,193 A | * | 5/1993 | Young et al. | 137/590 |
| 6,253,790 B1 | * | 7/2001 | Hara | 137/565.17 |
| 6,262,165 B1 | * | 7/2001 | Ariyasu et al. | 524/496 |
| 6,401,750 B2 | * | 6/2002 | Tokunaga | 137/565.34 |
| 6,435,365 B2 | * | 8/2002 | Pachciarz et al. | 220/4.14 |
| 6,545,081 B1 | * | 4/2003 | Nishihata et al. | 524/495 |
| 6,586,518 B1 | * | 7/2003 | Kita et al. | 524/496 |
| 6,863,941 B2 | * | 3/2005 | Detounay | 428/35.7 |
| 7,223,458 B2 | * | 5/2007 | Tango | 428/131 |
| 7,390,023 B2 | * | 6/2008 | Hirose et al. | 280/835 |
| 7,624,829 B2 | * | 12/2009 | Kubota | 180/69.4 |
| 2005/0126546 A1 | * | 6/2005 | Yagisawa | 123/509 |
| 2006/0273572 A1 | * | 12/2006 | Yamamura | 280/834 |

FOREIGN PATENT DOCUMENTS

JP 2007-224831 9/2007
* cited by examiner

*Primary Examiner* — Frank Vanaman
(74) *Attorney, Agent, or Firm* — Ditthavong Mori & Steiner, P.C.

(57) ABSTRACT

A fuel pump attachment structure includes a pump support member and a cover member. The pump support member has a fuel pump support surface via which a fuel pump is to be attached to a fuel tank inside the fuel tank made of second resin. The pump support member includes an insert plate and an insert nut. The cover member is made of first resin and provided on the fuel pump support surface of the pump support member.

12 Claims, 7 Drawing Sheets

FUEL PUMP ATTACHMENT STRUCTURE AND MOTORCYCLE

CROSS-REFERENCE TO RELATED APPLICATIONS

The present application claims priority under 35 U.S.C. §119 to Japanese Patent Application. No. 2008-083571, filed Mar. 27, 2008. The contents of this application are incorporated herein by reference in their entirety.

BACKGROUND OF THE INVENTION

1. Field of the Invention

The present invention relates to a fuel pump attachment structure and a motorcycle.

2. Discussion of the Background

Motorcycles equipped with a fuel tank above an engine and a fuel pump attached to the bottom of the fuel tank have been known in the related art (for example, see JP-A No. 2007-224831). Further, it has also been known to make the fuel tank of resin to reduce the weight of the main body. The contents of JP-A No. 2007-224831 are incorporated herein by reference in their entirety.

The thickness of the wall of a fuel tank has been increased to reduce heat influence of an engine. However, as the thickness of the wall increases, the weight of the main body increases, such that the effectiveness of resin decreases. Further, the cost also increases.

On the other hand, it may be considered to reduce heat influence of the engine by making the fuel tank of resin having large anti-creep property without increasing the thickness of the wall; however, this material is expensive and is difficult to be inserted into the small spaces of the mold in rotational molding, such that it is not practical.

SUMMARY OF THE INVENTION

According to one aspect of the present invention, a fuel pump attachment structure includes a pump support member and a cover member. The pump support member has a fuel pump support surface via which a fuel pump is to be attached to a fuel tank inside the fuel tank made of second resin. The pump support member includes an insert plate and an insert nut. The cover member is made of first resin and provided on the fuel pump support surface of the pump support member.

According to another aspect of the present invention, a motorcycle includes an engine, a fuel tank, a main body frame, a fuel pump, a pump support member, and a cover member. The fuel tank is made of second resin. The main body frame supports the engine and the fuel tank above the engine. The pump support member has a fuel pump support surface via which the fuel pump is attached to the fuel tank inside the fuel tank. The pump support member includes an insert plate and an insert nut. The cover member is made of first resin and provided on the fuel pump support surface of the pump support member.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE EMBODIMENT

Figure 1:
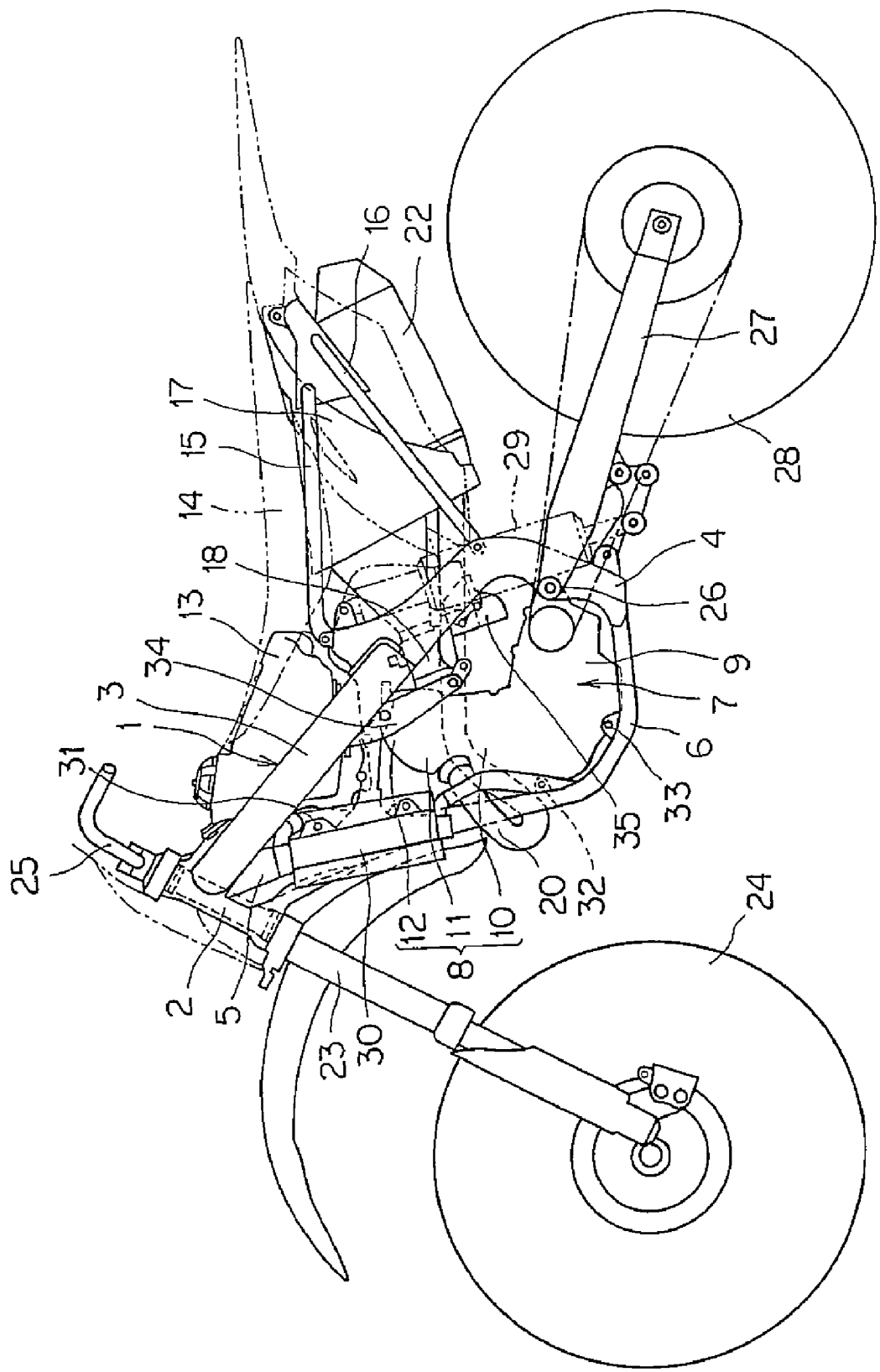
FIG. 1 is a side view of a motorcycle according to an embodiment of the present invention.

Embodiments will now be described with reference to the accompanying drawings, wherein like reference numerals designate corresponding or identical elements throughout the various drawings.

An embodiment of the present invention will be described hereafter with reference to the accompanying drawings. FIG. 1 is a side view of an off-road motorcycle equipped with a fuel pump attachment structure according to an embodiment of the present invention.

The main body frame 1 of the motorcycle includes a head pipe 2, main frames 3, center frames 4, a down frame 5, and lower frames 6, which are connected in a loop shape, and an engine 7 is supported therein. The engine 7 includes a cylinder 8 and a crankcase 9. The main frames 3, center frames 4, and lower frames 6 are each disposed in a pair at the left and right sides, whereas the head pipe 2 and down frame 5 each are one piece and disposed along the center of the main body.

The main frame 3 extends downward at an angle in a straight line above the engine 7 and is connected to the upper end of the center frame 4 extending upward/downward behind the engine 7. The down frame 5 extends downward at an angle in front of the engine 7 and of which the lower end is connected to the front end of the lower frame 6. The lower frame 6 bends under the engine 7 from the front lower portion of the engine 7 and extends rearward in a substantially straight line, and of which the rear end is connected with the lower end of the center frame 4.

A fuel tank 13 is disposed above the engine 7 and supported on the main frame 3. A seat 14 is disposed behind the fuel tank 13 and supported on a seat rail 15 extending rearward from the upper end of the center frame 4. A rear frame 16 is disposed under the seat rail 15. An air cleaner 17 is supported by the seat rail 15 and the rear frame 16 and sucks air from behind the main body to a cylinder head 11 through a throttle body 18.

An exhaust pipe 20 bends in a substantially S-shape from the front of the cylinder 8 and extends rearward, and is connected to a muffler 22 across the center frame 4 behind it, in which the rear end is supported by the rear frame 6.

A front fork 23 is supported by the head pipe 2 and a front wheel 24 supported to the lower end of the front fork is steered by a handlebar 25. The front end of a rear arm 27 is pivotably supported to the center frame 4 by a pivot shaft 26. A rear wheel 28 is supported by the rear end of the rear arm 27 and driven through a chain by the engine 7. A cushion unit 29 of a rear suspension is mounted between the rear ends of the rear arm 27 and the center frames 4.

Further, in FIG. 1, reference numeral '30' represents a radiator, reference numeral '31' represents a rubber mount of the radiator, reference numerals '32' and '33' represent engine mounts, reference numeral '34' represents an engine hanger, and reference numeral '35' represents an electric component case. Further, the engine 7 is also supported to the center frames 4 by the pivot shaft 26.

Figure 2:
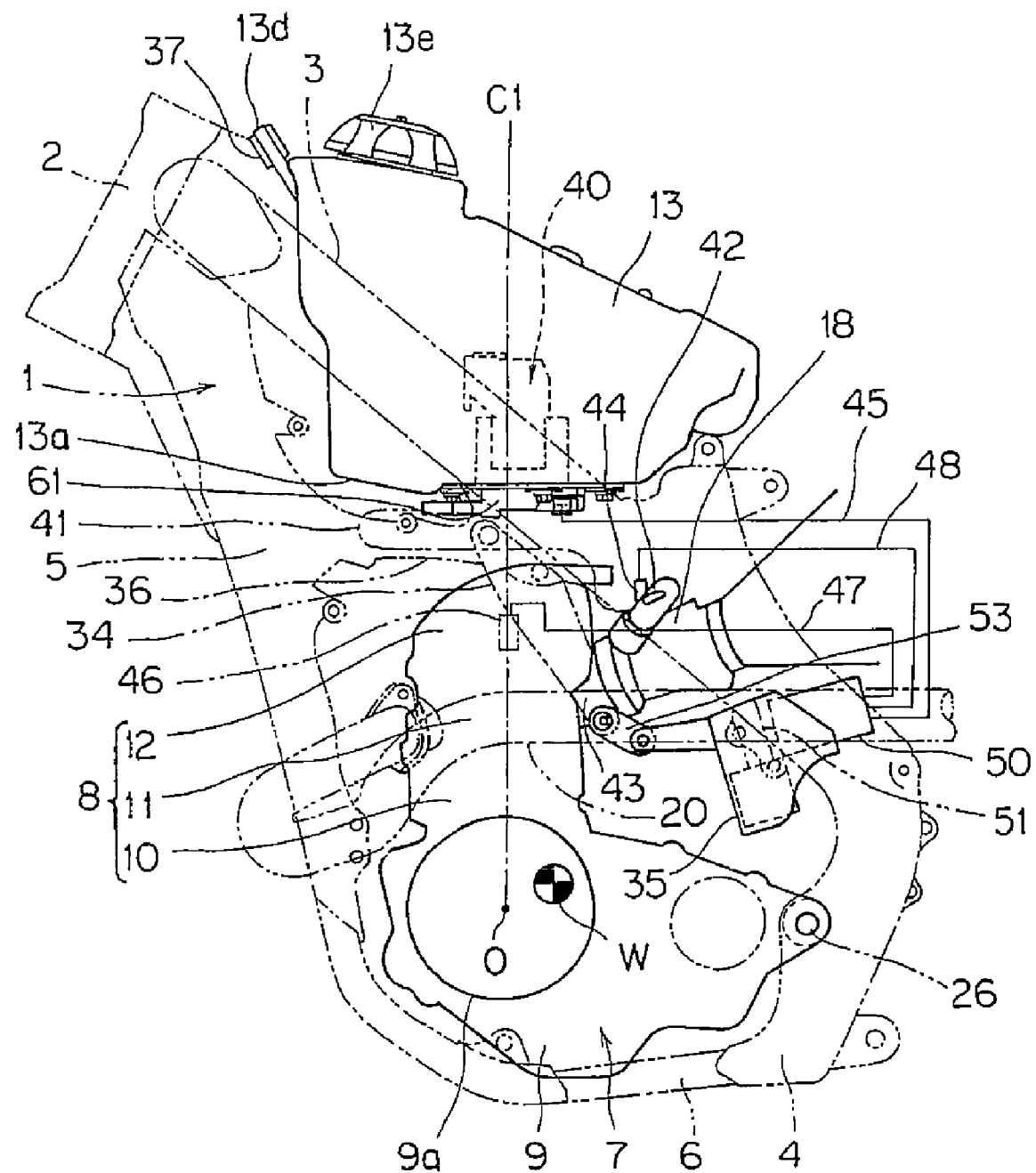
FIG. 2 is an enlarged side view showing an engine and a fuel supply system.

FIG. 2 is an enlarged side view of the engine and a fuel supply system.

The engine 7 is a water-cooled four cycle engine and the cylinder 8 is mounted in a vertically positioned manner at the front portion of the crank case 9 such that the cylinder axial line C1 is vertically positioned, and has a cylinder block 10, a cylinder head 11, and a cylinder cover 12, from the bottom to the top. By vertically positioning the cylinder 8, the engine 7 becomes short from front to back and is formed appropriate to off-road motorcycles.

The fuel tank 13 is disposed just above the cylinder 8. The fuel tank 13 has a gap as large as a stiffener 36 between its bottom and the upper portion of the head cover 12. The stiffener 36 is an arm-shaped frame reinforcement member that connects the middle portion in the vertical direction of the down frame 5 and the rear portion of the main frame 3. A built-in fuel pump 40 is accommodated in the fuel tank 13.

The fuel pump 40 is also disposed just above the cylinder 8, and in this configuration, is disposed such to overlap an extension line in the axial direction of the cylinder axial line C1, which is the center of the cylinder 8 (center of piston). The fuel pump 40 is preferably disposed to overlap a portion of the cylinder axial line C1, but may be disposed above the engine 7. The heavy fuel pump 40 can be disposed close to the center of gravity W of the engine 7 in the front-rear direction of the main body. The center of gravity W of the engine 7 is located close to the axial center O of a crankshaft 9a, at an angle at the upper rear side.

The fuel pump 40 is inserted inside from the bottom 13a of the fuel tank 13, a fuel supply pipe 41 extends out toward the front from a base 61 (described below in detail, see FIG. 3) which is the bottom of the fuel pump 40, bends rearward, and is connected to a fuel injection nozzle 42 of the throttle body 18. The fuel injection nozzle 42 is included in an electronic fuel injecting device known in the art. The fuel supply pipe 41, a comparatively short pipe for supplying high-pressure fuel from the fuel pump 40 to the fuel injection nozzle 42, bends, to the rear portion of the cylinder head 11 through between the bottom 13a and the head cover 12, which reduces pressure loss of fuel and the weight.

The throttle body 18 is connected to an intake channel 43 extending upward from the end of a slope of the cylinder head 11. The fuel injection nozzle 42 is inserted at an angle in a socket mounted on a side of the throttle body 18 and an injection hole at the end is disposed in the intake channel 43 to inject fuel into the intake channel 43. Further, an end of an electric wire for control 48 is connected to the fuel injection nozzle 42 through an electric wire connector 44.

An end of a high tension cord 47, which is a high-voltage electric wire for ignition, is connected to a roughly sketched ignition plug 46 of the head cover 12, such that high-voltage for igniting is applied. Further, a driving electric wire 45 for supplying driving voltage is connected to the fuel pump 40. The other ends of the electric wire 45, 47, 48 are connected to a condenser 50 mounted in the electric component case 35. A regulator 51 is accommodated in the electric component case 35, which is an electric component independent from the condenser 50.

The electric component case 35 is disposed behind the cylinder 8, above the crankcase 9, and close to the cylinder 8 of which the left side is supported to the center frame 4. At the right side of the electric component case 35, a stay 53 extending forward is connected and supported to the front end of the engine hanger 34. Further, the exhaust pipe 20 extends rearward across a side of the electric component case 35, of which the rear end is open at the rear portion of the electric component case 35 (see FIG. 1). Therefore, the electric component case 35 effectively blocks heat from the cylinder 8 or exhaust heat to the electric components.

Figure 3:
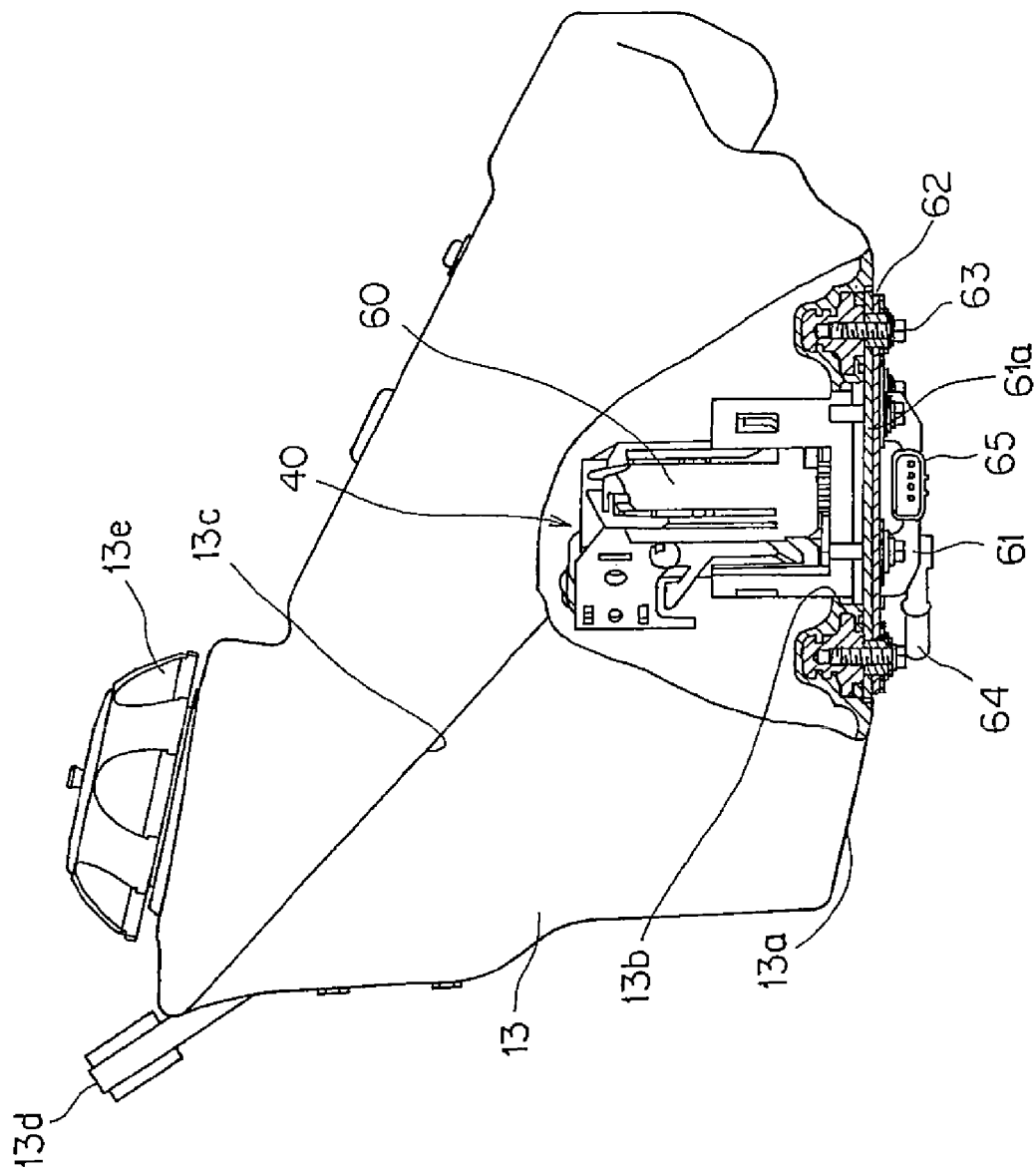
FIG. 3 is a side view showing a part of a fuel tank where a fuel pump is attached, which is partially cut.
Figure 4:
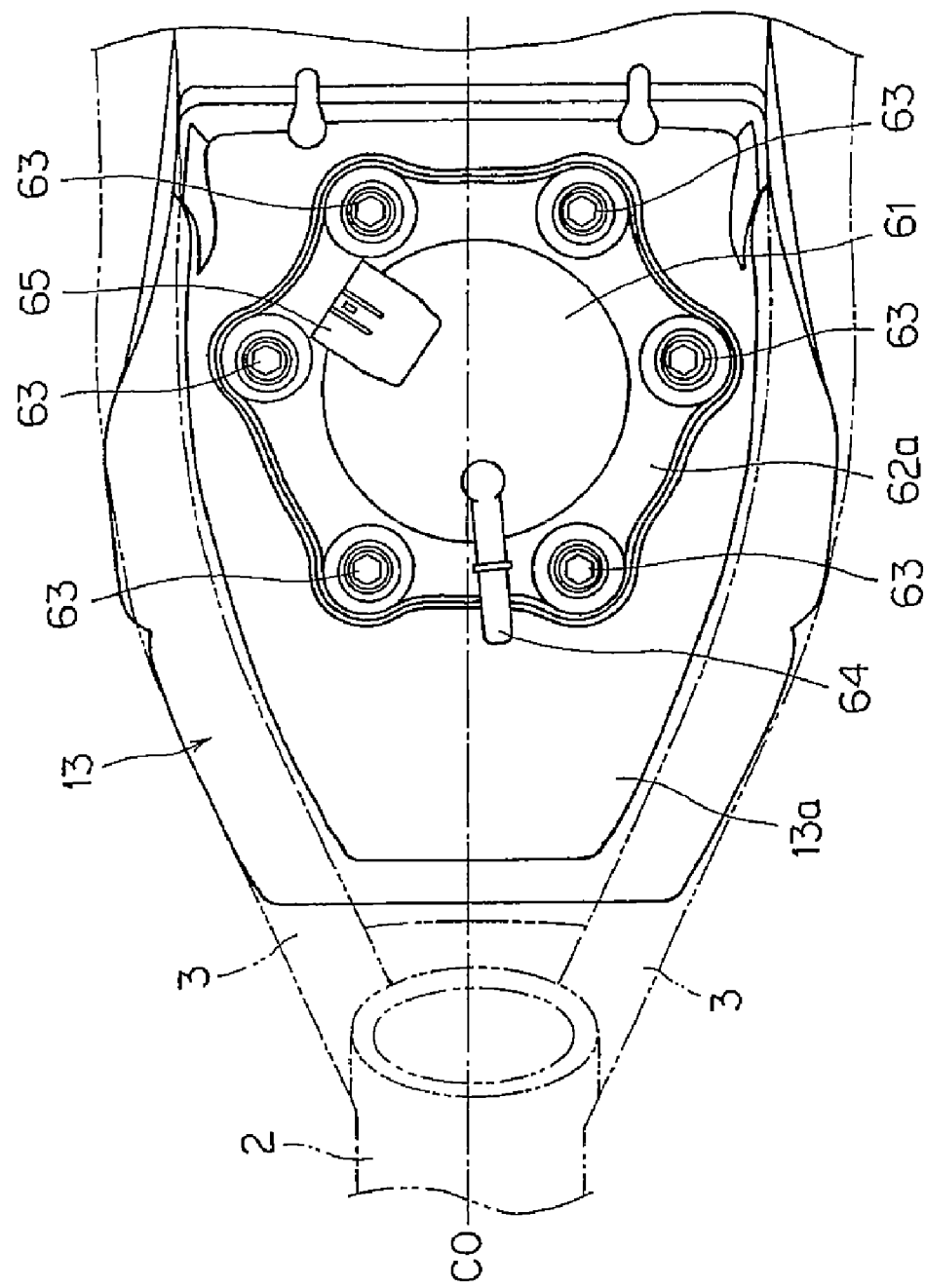
FIG. 4 is a bottom view of the fuel tank where the fuel pump is attached.
Figure 5:
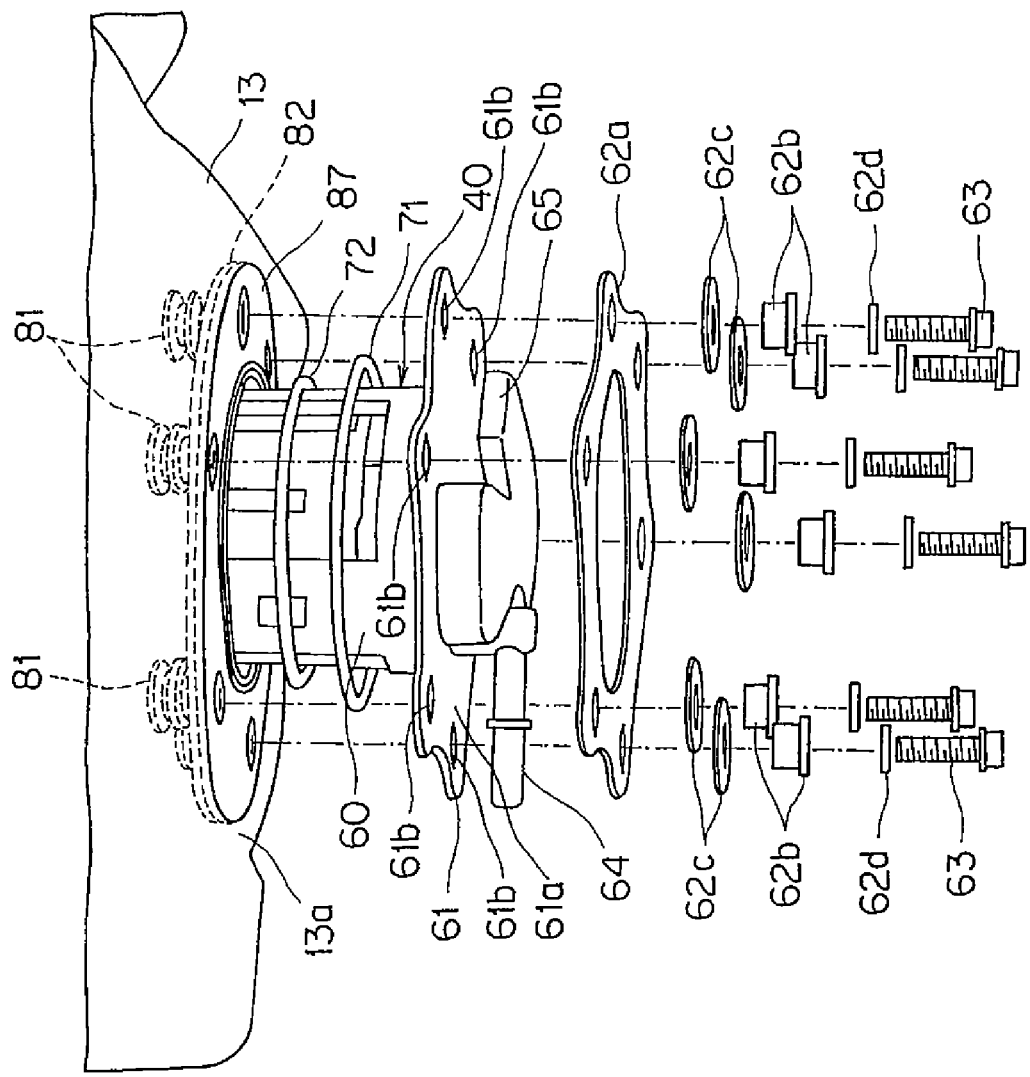
FIG. 5 is an exploded perspective view illustrating attachment of the fuel pump.

FIG. 3 is a side view showing a side of the fuel tank 13, which is partially cut, FIG. 4 is a bottom view of the fuel tank 13, and FIG. 5 is an exploded perspective view illustrating the attachment of the fuel pump 40.

The fuel tank 13, as shown in FIG. 3, is substantially formed in a right triangle having a right-angled portion at the left lower portion when seen from a side, in which a substantially right-angled portion is positioned at the front lower portion and the upper surface is declined rearward, such that it is relatively small. A stepped portion 13c which is disposed on the upper surface of the main frame 3 is formed on both sides of the front of the fuel tank 13. Further, an attachment bracket 13d is mounted at the front of the fuel tank 13. The lower portion of the attachment bracket 13d is fixed to the upper portion of the front of the side wall of the fuel tank 13 by bolts and the upper portion is integrally formed with the head pipe 2 and fixed to a gusset 37 (see FIG. 2) extending rearward by bolts. Further, a tank cap 13e for closing a fuel filler is attached to the upper portion of the fuel tank 13.

The fuel pump 40, as shown in FIG. 3, has a fuel pump main body 60 forming the upper portion of the fuel pump 40 and a base 61 forming the lower portion.

The fuel pump main body 60 is inserted in the fuel tank 13 to suck up the fuel in the tank. Further, the base 61 is exposed to the lower side at the bottom 13a while being attached to the fuel tank 13. The base 61 has a flange 61a protruding to the side of the fuel pump 40. The flange 61a, as shown in FIG. 4, is substantially formed in a hexagon when seen from the bottom and an attachment hole 61b (see FIG. 5) is formed in each of the six corners of the hexagon. The fuel pump 40 is attached to the bottom 13a of the fuel tank 13 by screwing six bolts 63 from the lower side through a ring-shaped plate 62a, a collar 62b, and washers 62c, 62d, after contacting the flange 61a to the bottom 13a from the lower side (see FIGS. 4 and 5).

Further, a joint pipe 64 that is connected to a discharge hole (not shown) of the fuel pump main body 60 extends forward to the base 61, as shown in FIG. 3, and connected with an end of the fuel supply pipe 41 (see FIG. 2). Further, a connecter 65 is mounted and the electric wire 45 for fuel pump driving voltage is disposed to the connector. The joint pipe 64 extends at an angle forward around the main body center C0 and the connector 65 slightly protrudes rearward at a side.

The main frame 3, as shown in FIG. 4, is divided to the left and right sides from the head pipe 2 and extends rearward while widening. Accordingly, the space surrounded by head pipe 2 and the front portions of the left and right main frames 3 is a substantially acute triangle, and the bottom 13a of the fuel tank 13 accommodated in the space has a shape of which the width decreases toward the head pipe 2 in front. The base 61 of the fuel pump 40 is attached to a position around the maximum-width portion on the bottom 13a, such that the fuel pump cannot practically move forward by interference of the narrow portion of the bottom 13a to the maximum-width portion of the base 61 even if it would be moved further forward from the position. Therefore, the position of the fuel pump 40 shown in the drawing is restricted by the shape of the bottom 13a, such that it can be mounted substantially at the front end.

Figure 6:
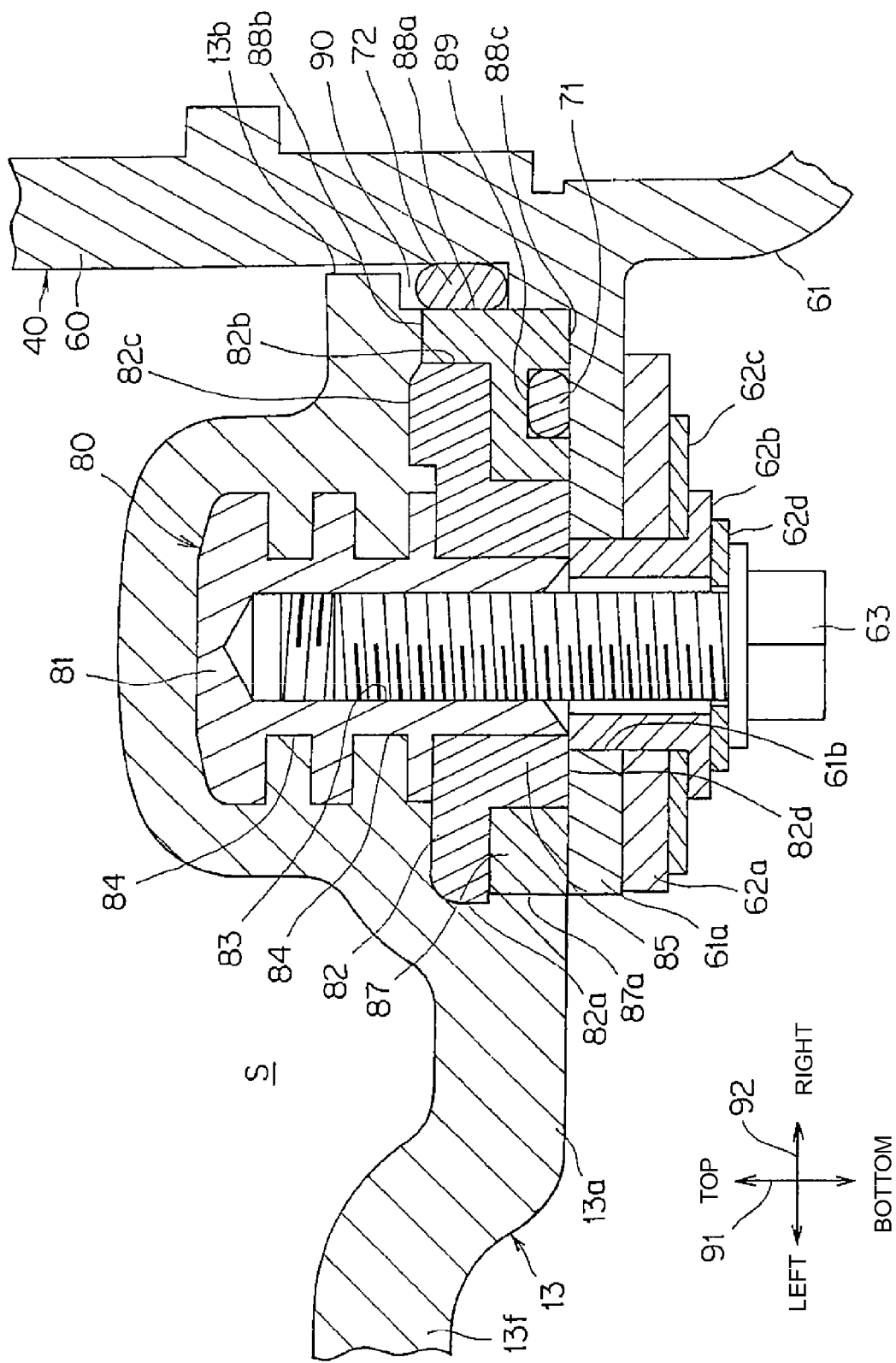
FIG. 6 is an enlarged cross-sectional view showing the attachment portion of the fuel tank and the fuel pump.

FIG. 6 is an enlarged cross-sectional view showing a fixed portion of the fuel pump 40 by a bolt 63, in the attachment portion of the fuel pump 40 to the fuel tank 13. There are six attachment portions by the bolts 63, but all of them have the structure shown in FIG. 6. In FIG. 6, the inside of the fuel tank 13 is represented by reference numeral 'S'. Further, FIG. 7 is a perspective view of a pump support member (insert ring and insert nut).

In the fuel tank 13, as shown in FIG. 6, a pump support member 80 (insert ring 82 (insert plate) and nut 81) is mounted around the opening 13b of the fuel tank 13. The pump support member 80, as shown in FIG. 7, the nuts 81 are attached (fitted or tightened) to the insert ring 82 that is a continuous ring disposed along the circumference of the opening 13b.

The nut 81 is mounted to protrude upward from the insert ring 82. Further, the six nuts 81 are disposed to form each hexagonal tip. A bolt hole 83 are formed from the bottom through the nut 81, as shown in FIG. 6. The position of the bolt hole 83 corresponds to the position of the attachment hole 61b formed in the base 61 of the fuel pump 40 and the bolt 63 is screwed in the bolt hole 83.

Figure 7:
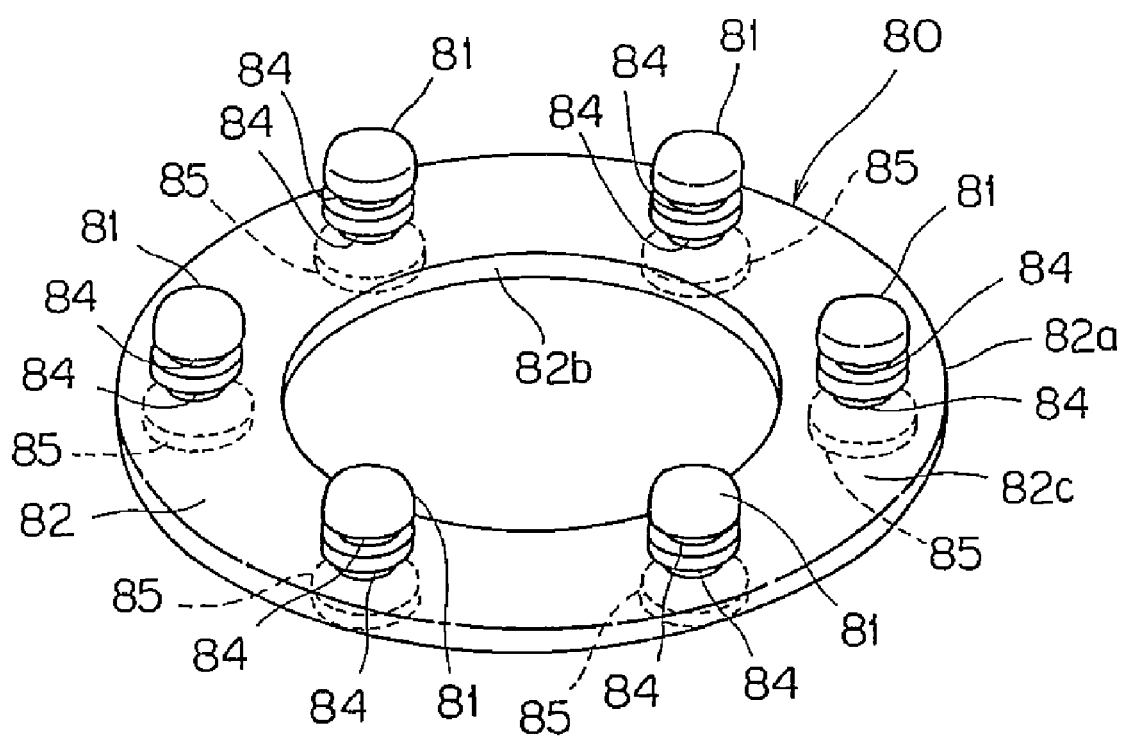
FIG. 7 is a perspective view of an insert nut.

Further, two recessed portions 84 are formed around the outer surface of the nut 81 toward the center of the nut 81, as shown in FIGS. 6 and 7. The recessed portion 84 is continuously formed in the circumferential direction of the nut 81. Further, the two recessed portions 84 are formed at a distance from each other in the up-down direction.

The outer surface 82a of the insert ring 82, as shown in FIG. 6, is positioned on the outer side from the outer circumference of the flange 61a when the fuel pump 40 is attached. Further, the angled portion on the upper side of the outer surface 82a, as shown in FIG. 6, is roundly chamfered to improve insertion of the resin in molding. A cover member 87 may also be roundly chamfered.

Cylindrical protrusions 85 protruding downward and corresponding to the six nuts 81 are formed on the insert ring 82, as shown in FIGS. 6 and 7. The bottoms of the cylindrical protrusion 85, as shown in FIG. 6, are in surface contact with the upper surface of the flange 61a of the fuel pump 40.

Further, the inner side 82b of the insert ring 82 (opening of the insert ring 82), as shown in FIG. 6, is formed to be positioned substantially the same as the inner circumference of the plate 62a when the plate 62a is attached such that fastening force of the bolt 63 is applied throughout the insert ring 82.

A cover member 87 having an L-shaped cross section is mounted around the outer circumference of the above-mentioned cylindrical protrusion 85, as shown in FIGS. 6 and 7. The cover member 87, similar to the insert ring 82, has a continuous ring shape disposed in the circumferential direction of the opening 13b, and is insert-formed by simultaneously and integrally with the pump support member 80 mounted in advance to a mold, by injection molding. Accordingly, the outer sides of the six cylindrical protrusions 85 are covered with the cover member 87. Further, the bottom of the cover member 87 levels with the bottom 82d of the cylindrical protrusion 85. The bottom portion 88c of the cover member 87 also is in surface contact with the upper surface of the flange 61a. That is, the bottom 82d and the bottom portion 88c form the fuel pump support surface.

The outer side 87a of the cover member 87, in the cross section shown in FIG. 6, is disposed slightly inside from the outer side 82a of the insert ring 82. Further, the inner side 88a of the cover member 87 extends inside (to the opening 13b) from the inner side 82b of the insert ring 82 and the front end of the extending portion is vertically disposed. The vertical upper end 88b is positioned slightly lower than the upper portion 82c of the insert ring 82.

A material having larger anti-creep property than the resin for the fuel tank main body 13f is used as the resin (first resin) for the cover member 87, such as a high-density polyethylene.

On the other hand, the fuel tank main body 13f is formed by rotational molding. In detail, in the rotational molding, the pump support member 80 where the above-mentioned cover member 87 is integrally attached is mounted in advance to the mold and powdered resin (second resin) is put into a mold for rotational molding.

In the rotational molding, thermoplastic powder resin is put into the mold, the mold is heated in a heating furnace and the resin is melted while rotating about two axial directions. Thereafter, a mold is formed by cooling-solidifying the inner portion.

In this process, the fuel pump main body 13f is integrally formed without forming a gap from the outer surface of the pump support member 80 (the outer surface of the nut 81 or the insert ring 82) in the rotational molding. In particular, by inputting the resin in the recessed portion 84 of the nut 81 without forming a gap in molding, the fuel tank main body 13f is strongly attached to the pump support member 80.

Further, the fuel tank main body 13f contacts with the outer side 87a and the upper end 88b of the cover member 87 in the rotational molding and is deposited to each other. The mold for the rotational molding is heated in the molding, such that the pump support member 80 mounted in advance in the mold and the cover member 87 integrally attached are also heated. Therefore, the cover member 87 and the fuel tank main body 13f can be easily deposited and joined (deposition, melting etc.) to each other in the rotational molding.

Accordingly, the pump support member 80 is positioned between the cover member 87 and the fuel tank main body 13f by joining of the cover member 87 and the fuel tank main body 13f, such that the outer circumference other than the surface of the fuel pump 40 contacting with the flange 61a is covered (see FIG. 6).

On the other hand, two O-rings 71, 72 that seal the fuel in an S inside of the fuel tank from the outside of the fuel tank is attached around the opening 13b of the fuel tank 13 when the fuel pump 40 is attached, as shown in FIG. 6.

One O-ring 71 (second seal member), as shown in FIG. 6, is continuously mounted along the outer circumference of the fuel pump 40, between the flange 61a and the bottom portion 88c of the cover member 87. A seal groove 89 where the O-ring 71 is inserted is formed in the bottom portion 88c of the cover member 87.

The O-ring 71 receives force in the up-down direction 91 (pressing direction, surface direction) by the fastening force of the bolt 63 and functions as a seal when the fuel pump 40 is attached. Further, the force is applied to the insert ring 82 through the cover member 87. That is, between the O-ring 71 and the insert ring 82 in the up-down direction 91, as shown in FIG. 6, only the cover member 87 having large anti-creep property is disposed, such that the heat influence from the engine 7 is not easily transmitted to the sealed portion.

Further, the other O-ring 72 (first seal member), as shown in FIG. 6, is continuously mounted along the outer circumference of the fuel pump 40, between the fuel pump main body 60 and the inner side 88a of the cover member 87. Further, a gap 90 for inserting the O-ring 72 is defined between the inner side 88a and the fuel pump main body 60.

The O-ring 72 receives force in the radial direction 92 (pressing direction) when the fuel pump main body 60 is pressed and inserted into the opening 13b of the fuel tank, such that it functions as a seal when the fuel pump 40 is attached. Further, the force is transmitted to the inner side 82b of the insert ring 82 through the cover member 87. Only the cover member 87 having larger anti-creep property is disposed between the O-ring 72 and the inner side 82b in the left-right direction 92, as shown in FIG. 6, such that the heat influence from the engine 7 is also not easily transmitted to the sealed portion.

According to the attachment structure of the fuel pump in the embodiment of the present invention, the pump support member 80 is composed of the insert ring 82 and the nuts 81, the cover member 87 is attached between the insert ring 82 of the pump support member 80 and the flange 61a of the fuel pump 40, the fuel tank main body 13f is attached to the insert ring 82 or the nut 81, and the cover member 87 is made of a material having larger anti-creep property than the fuel tank main body 13f, such that it is possible to prevent heat deformation of the fuel tank 13 by the cover member 87 that is hardly deformed by the heat from the engine 7. As a result, even though the wall thickness of the fuel tank 13 is not increased, heat influence is not generated, and seal property can be ensured. Further, the entire fuel tank 13 is not made of a material having large anti-creep property, such that cost is saved and resin molding becomes simplified.

Further, the first resin has larger anti-creep property than the second resin, such that the resin disposed between the insert ring 82 and the attachment portion of the fuel pump 40 is hardly influenced by the heat and heat influence at the attachment portion of the fuel pump 40 can be reduced. As a result, even though the wall thickness of the fuel tank 13 is not increased and the heat influence by the engine 7 can be reduced.

Further, because the fuel tank main body 13f contacts with and deposited to the outer side 87a and the upper end 88b of the cover member 87 in the rotational molding, the nut 81 and the insert ring 82 are covered with the resin and the fuel tank main body 13f, and the fuel tank main body 13f, the nut 81, and the insert ring 82 are more strongly attached. Further, a layer of other materials is not formed between the fuel tank main body 13f and the outer side 87a and the upper end 88b of the cover member 87, and a layer gap is not generated, such that seal property is improved.

Further, the cover member 87 is integrally formed in advance to the pump support member 80 and the fuel tank main body 13f is integrally formed to the pump support member 80 equipped with the cover member 87 by rotational molding, such that it is not needed to insert the resin forming the fuel tank main body 13f to the portion where the cover member 87 is mounted, in the rotational molding; and as a result, errors are not generated in molding. Further, since it is possible to easily deposit the cover member 87 and the fuel tank main body 13f using rotational molding, as compared with blow molding, it is possible to increase the strength at the attachment portion of the fuel tank 13 and achieve a structure that is less influenced by heat deformation. Further, since resin that has large anti-creep property and is difficult to be inserted in the small spaces of the mold is not used as the resin forming the fuel tank main body 13f, it is possible to strongly fix the resin for the fuel tank main body 13f by inserting the resin in the small spaces of the pump support member 80.

Further, since the fuel tank 13 has the opening 13b for inserting the fuel pump 40, the pump support member 80 is disposed around the opening 13b, and the cover member 87 is mounted on the pump support surface, the inner side 88a of the cover member 87 mounted to the pump support member 80 facing the opening 13b is positioned more inside than the inner side 82b of the insert ring 81 facing the opening 13b. In addition, the cover member 87 is attached in an L-shape from the opening of the insert ring 82 to the pump support surface in the cross section vertically cut through the center of the fuel pump 40. Therefore, it is also possible to dispose the first resin having large anti-creep property between the fuel pump main body 60 and the insert ring 82. As a result, it is possible to achieve a structure in which the heat influence is small not only between the flange 61a and the insert ring 82, but between the fuel pump main body 60 and the insert ring 82. Accordingly, the seal property is also improved.

Further, the fuel tank 13 has the opening 13b for inserting the fuel pump 40, the pump support member 80 is disposed around the opening 13b, and the inner side 88a of the cover member 87 facing the opening 13b is positioned more inside than the inner side 82b of the insert ring 82 facing the opening 13b, such that it is also possible to dispose resin having large anti-creep property between the fuel pump main body 60 and the insert ring 82. Therefore, it is possible to archive a structure in which the heat influence is small not only between the flange 61a of the fuel pump and the insert ring 82, but between the fuel pump main body 60 and the insert ring 82. Accordingly, the seal property is also improved.

Further, since the recessed portion 84 is formed in the outer surface of the nut 81 of the pump support member 80, the resin is inserted in the recessed portion in the rotational molding of the fuel tank main body 13f, such that it is possible to strongly attach the pump support member 80 and the fuel tank 13.

Further, since the position of the outer side 87a of the cover member 87 is substantially the same as the position of the outer circumference of the flange 61a of the fuel pump 40 and also is substantially the same as the position of the outer circumference of the plate 62a used for attachment of the fuel pump 40, a majority of the fastening force of the bolt 63 for attaching the fuel pump 40 is transmitted to the insert ring 82 of the pump support member 80. Therefore, it is possible to reduce deformation due to the heat influence in the range where the fastening force acts. Accordingly, seal property can be ensured by the act of the fastening force.

In particular, the O-ring 72 for sealing between the circumference of the opening 13b of the fuel tank 13 for inserting the fuel pump 40 and the fuel pump 40 in the radial direction 92 and the O-ring 71 for sealing between the pump support surfaces 82d, 88c and the fuel pump 40 in the surface direction 92 are mounted while the seal groove 89 for inserting the O-ring 71 is formed in the cover member 87, such that it is possible to ensure sealing in the two directions, the radial direction 92 and the surface direction 91, and it is possible to improve seal property at the attachment surface where the fuel tank 13 contacts with the fuel pump 40.

Although an embodiment of the present invention has been described above, various modifications and changes can be made on the basis of the scope of the present invention.

For example, in this embodiment, the pump support member 80 is a separate part composed of the nuts 81 and the insert ring 82; however, may be integrally formed with the nuts 81 and the insert ring 82. For example, the pump support member 80 may be integrally formed in molding or forging.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A fuel pump attachment structure comprising:
a cover member made of first resin; and
a pump support member having a fuel pump support surface via which a fuel pump is to be attached to a fuel tank inside the fuel tank made of second resin, the pump support member comprising an insert plate and an insert nut, wherein the cover member is provided on the fuel pump support surface of the pump support member, wherein the first resin has anti-creep property higher than anti-creep property of the second resin, wherein the insert plate includes a cylindrical protrusion, and wherein an end of the cylindrical protrusion forms the fuel pump support surface, wherein the cover member includes a bottom portion that is flush and level with the fuel pump support surface, and wherein the bottom portion of the cover member forms an adjacent fuel pump support surface that is adjacent to and level with the fuel pump support surface of the pump support member, and wherein an outer side and an inner side of the insert plate are sandwiched between the cover member made of the first resin and the fuel tank made of the second resin from both said sides of the insert plate, and are supported by the cover member and the fuel tank.

2. The fuel pump attachment structure according to claim 1, wherein the first resin and the second resin are fused together.

3. The fuel pump attachment structure according to claim 1, wherein the pump support member and the cover member are integrally formed, and wherein the fuel tank and the pump support member with the cover member are integrally formed using rotational molding.

4. The fuel pump attachment structure according to claim 1, wherein a plurality of recessed portions are formed in an outer surface of the insert nut.

5. The fuel pump attachment structure according to claim 1, wherein the insert plate and the cover member have a center opening corresponding to an opening provided in the fuel tank through which the fuel pump is to be inserted into the fuel tank, and wherein the pump support member and the cover member are so provided that an inner peripheral face around the center opening of the cover member is positioned inside an inner peripheral face around the center opening of the insert plate.

6. The fuel pump attachment structure according to claim 5, wherein the cover member includes an inner side that extends between the inner peripheral face of the insert plate and the fuel pump.

7. The fuel pump attachment structure according to claim 5, further comprising:

a first seal member provided around a circumferential face of the fuel pump; and a second seal member provided between the fuel pump support surface and a surface of the pump to be supported on the fuel pump support surface.

8. The fuel pump attachment structure according to claim 7, wherein a seal groove in which the second seal member is inserted is formed in the cover member.

9. The fuel pump attachment structure according to claim 7, wherein the cover member is provided between the insert plate and the first seal member which is provided between the cover member and the fuel pump, and wherein the cover member is provided between the insert plate and the second seal member which is provided between the cover member and the fuel pump.

10. A motorcycle comprising:

an engine;

a cover member made of first resin;

a fuel tank made of second resin;

a main body frame supporting the engine and the fuel tank above the engine;

a fuel pump; and a pump support member having a fuel pump support surface via which the fuel pump is attached to the fuel tank inside the fuel tank, the pump support member comprising an insert plate and an insert nut, wherein the cover member is provided on the fuel pump support surface of the pump support member, wherein the first resin has anti-creep property higher than anti-creep property of the second resin, wherein the insert plate includes a cylindrical protrusion, and wherein an end of the cylindrical protrusion forms the fuel pump support surface, wherein the cover member includes a bottom portion that is flush and level with the fuel pump support surface, and wherein the bottom portion of the cover member forms an adjacent fuel pump support surface that is adjacent to and level with the fuel pump support surface of the pump support member, and wherein an outer side and an inner side of the insert plate are sandwiched between the cover member made of the first resin and the fuel tank made of the second resin from both said sides of the insert plate, and are supported by the cover member and the fuel tank.

11. The motorcycle according to claim 10, wherein the fuel pump is mounted to a bottom surface of the fuel tank.

12. A fuel pump attachment comprising:

cover means made of first resin for covering a fuel pump support surface; and pump support means for attaching a fuel pump to a fuel tank inside the fuel tank made of second resin, the pump support means having the fuel pump support surface, the pump support means comprising insert plate means and insert nut means, wherein the first resin has anti-creep property higher than anti-creep property of the second resin, wherein the insert plate means includes a cylindrical protrusion, and wherein an end of the cylindrical protrusion forms the fuel pump support surface, wherein the cover means includes a bottom portion that is flush and level with the fuel pump support surface, and wherein the bottom portion of the cover means forms an adjacent fuel pump support surface that is adjacent to and level with the fuel pump support surface of the pump support means, and wherein an outer side and an inner side of the insert plate are sandwiched between the cover means made of the first resin and the fuel tank made of the second resin from both said sides of the insert plate, and are supported by the cover means and the fuel tank.

* * * * *